US011361872B2

(12) United States Patent
Moricca

(10) Patent No.: US 11,361,872 B2
(45) Date of Patent: Jun. 14, 2022

(54) CONTROLLED HIP CONTAINER COLLAPSE FOR RADIOACTIVE WASTE TREATMENT

(71) Applicant: Salvatore Moricca, New South Wales (AU)

(72) Inventor: Salvatore Moricca, New South Wales (AU)

( * ) Notice: Subject to any disclaimer, the term of this patent is extended or adjusted under 35 U.S.C. 154(b) by 936 days.

(21) Appl. No.: 15/816,382

(22) Filed: Nov. 17, 2017

(65) Prior Publication Data

US 2019/0198185 A1 Jun. 27, 2019

Related U.S. Application Data

(60) Provisional application No. 62/424,042, filed on Nov. 18, 2016.

(51) Int. Cl.

| | |
|---|---|
| ***G21F 9/36*** | (2006.01) |
| ***G21F 5/005*** | (2006.01) |
| ***B09B 3/00*** | (2022.01) |
| ***G21F 1/08*** | (2006.01) |
| ***G21F 5/14*** | (2006.01) |
| ***G21F 9/02*** | (2006.01) |
| ***G21F 9/30*** | (2006.01) |

(52) U.S. Cl.
CPC .................. *G21F 9/36* (2013.01); *B09B 3/00* (2013.01); *G21F 1/08* (2013.01); *G21F 5/005* (2013.01); *G21F 5/14* (2013.01); *G21F 9/02* (2013.01); *G21F 9/30* (2013.01); *B09B 3/0075* (2013.01)

(58) Field of Classification Search
CPC ... G21F 9/36; G21F 1/08; G21F 5/005; G21F 5/14; G21F 9/02; G21F 9/30; B09B 3/00; B09B 3/0075
USPC ............................................................ 588/16
See application file for complete search history.

(56) References Cited

U.S. PATENT DOCUMENTS 4,834,917 A * 5/1989 Ramm ...................... B09B 1/00 588/15
2014/0221720 A1* 8/2014 Moricca ................. G21F 5/005 588/11

* cited by examiner

*Primary Examiner* — Edward M Johnson
(74) *Attorney, Agent, or Firm* — Finnegan, Henderson, Farabow, Garrett & Dunner, LLP

(57) ABSTRACT

A container for the consolidation of waste materials including radioactive containing waste, and a method of consolidating such materials. The container comprises an outer cylinder and an inner cylinder comprising internal compression plates that are designed to resist collapse during consolidation, and therefore control the size of the consolidated container to a predictable shape and dimension. The container is sufficient to hold a variety of materials, including hazardous, toxic, or radioactive waste, and the container is configured to hold such waste without releasing it to the environment.

19 Claims, 7 Drawing Sheets

CONTROLLED HIP CONTAINER COLLAPSE FOR RADIOACTIVE WASTE TREATMENT

This application claims priority to U.S. Provisional Application No. 62/424,042, filed on Nov. 18, 2016, which is incorporated herein by reference in its entirety.

The present disclosure relates generally to containers used in a Hot Isostatic Pressing (HIP)ing systems for consolidating wastes, such as radioactive wastes. The present disclosure also relates to methods of consolidating such wastes by using containers that have controlled collapse characteristics.

Use of metal containers for Hot Isostatic Pressing (HIP) ing of metal powders is common industry practice. The HIP containers are either regular shapes such as a cylinder or more complex where they are the shape of the final product only larger to accommodate the shrinkage from going from a metal powder to a final dense product. When dealing with non-radioactive materials, the particle size and shape of metal powders can be finely controlled during their manufacture to give high packing densities when being filled into the metal HIP containers. As a result, the HIP container collapses are usually only of the order of 30-40%, which leads to a symmetric and controlled collapse that can be consistently predicted. As a result, when working with metal powders and non-radioactive materials, it is conceivable to model HIP container collapse to prevent container distortion.

With the application of HIP technology to treatment of radioactive waste; however, the same control of the starting product is not possible. The powder properties such as particle size and shape are largely unpredictable. It is not unusual that packing densities can be as low as 15-25% of the theoretical final density, leading to possible volume reductions of 75% or more. Additionally, the chemistry of the radioactive waste forms is highly variable. As a result, modeling and predicting HIP container collapse is neither practical nor viable for a wide range of wastes, including radioactive material, where powder characterization is difficult, if not impossible.

Coupled with the foregoing limitations of the collapse characteristics of the HIP container are the problems associated with the material being processed. As the powdered waste fills the HIP container, at a lower density than the theoretical final density, the difference in the starting density to the final density means the container shrinkage (volume change) will need to be accommodated.

To solve the foregoing problems associated with variations in the starting fill densities due to packing efficiency or different powder morphology, the amount of shrinkage and therefore final container dimensions will be different. The Inventor has developed a HIP container that will collapse to the same diameter every time irrespective of the starting packing density of the powder. The height may vary slightly but well within the tolerances of the over-pack disposal canister. The Inventor has also developed a predictable method of consolidating waste, including nuclear waste, using the disclosed HIP container. The disclosed container and method are directed to overcoming one or more of the problems set forth above and/or other problems of the prior art.

SUMMARY

In one embodiment, there is disclosed a container for the consolidation of waste material, such as nuclear containing waste, comprising: an outer cylinder; and an inner cylinder comprising internal compression plates that are configured to resist collapse during consolidation. The described container enables one to control the size of the consolidated container to a predictable shape and dimension upon hot isostatic pressing. As indicated, the container may be one that is sufficient to hold and consolidate a variety of toxic, hazardous, or radioactive liquid or powered waste materials without the release of radioactivity.

In another embodiment there is disclosed a method of producing a consolidated article. In an embodiment, the method comprises filling a container with material to be consolidated, the container comprising an outer cylinder; and an inner cylinder comprising internal compression plates that are configured to resist collapse during consolidation. In an embodiment, the method comprises collapsing the container by applying heat and/or pressure to consolidate the material in the container and to produce a consolidated article having a predictable shape and/or dimension.

Aside from the subject matter discussed above, the present disclosure includes a number of other features such as those explained hereinafter. Both the foregoing description and the following description are exemplary only.

BRIEF DESCRIPTION OF THE DRAWINGS

The accompanying figures are incorporated in, and constitute a part of this specification.

FIG. 5A is a perspective of FIG. 4D further comprising end plates and lids. FIG. 5B shows FIG. 5A in cross section and showing regularly spaced consolidation plates prior to consolidation. FIGS. 5C and 5E show the assembled system and the final product, respectively, after consolidation, and reflecting shrinkage of the consolidated material. FIG. 5D shows FIG. 5C in cross section, with the solid consolidated material in cross hatching. FIG. 5E isolates the consolidation plates that are touching after consolidation. FIG. 5F shows the final consolidated material with the Controlled Collapse HIP Container according to the present disclosure removed.

FIG. 7C shows a cross-sectioned perspective of the inner liner inserted prior to top lid being welded in.

FIG. 8A is a schematic of an internal compression plate that is curved to match the radius of the inner and outer containers. FIG. 8B is a schematic of an internal compression plate that is configured to touch at least one other compression plate during hot isostatic pressing that specifically comprises right angled edges.

DETAILED DESCRIPTION

Figure 1A:
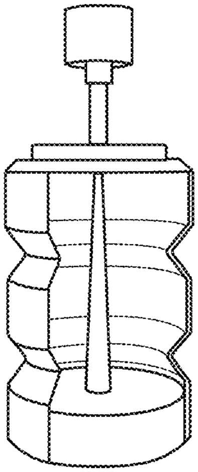
FIGS. 1A-1E are schematics of HIP processing steps for waste treatment, including filling the container (FIG. 1A), evacuation and sealing of the container (FIG. 1B), loading of the container into the HIP (FIG. 1C), applying heat and pressure to the container (FIG. 1D), and the final product (FIG. 1E).
Figure 1B:
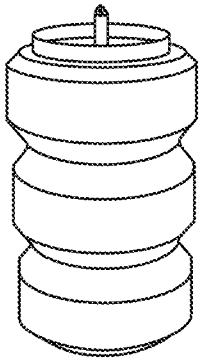
Figure 1C:
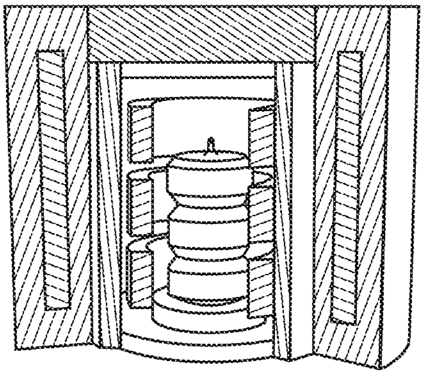
Figure 1D:
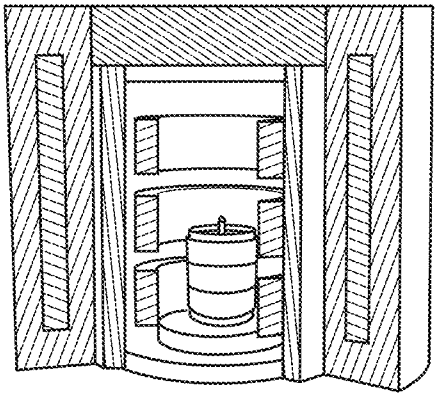
Figure 1E:
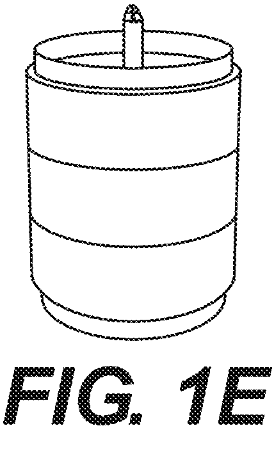

It has been demonstrated that the new HIP-Container overcomes a number of key issues raised with the prior art. With reference to FIGS. 1A through 1E, there is shown in schematics of prior art HIP processing steps for waste treatment. The HIP can is filled with powdered waste (FIG. 1A) and then evacuated and sealed (FIG. 1B). The container is then loaded into the HIP (FIG. 1C), where heat and pressure are applied to the container (FIG. 1D) to achieve the final product (FIG. 1E).

Figure 2A:
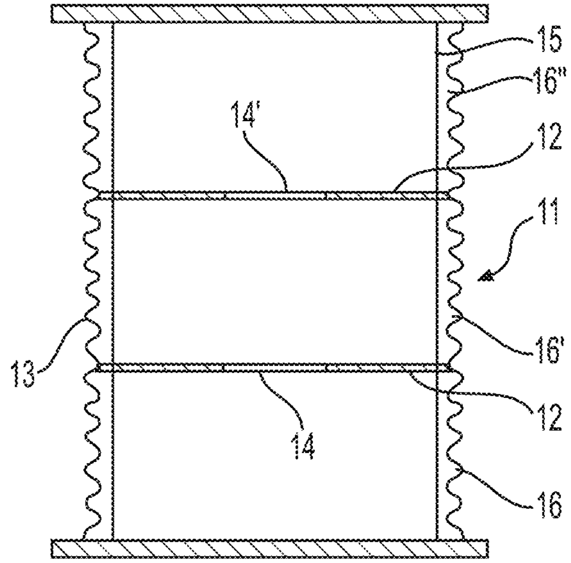
FIG. 2A (PRIOR ART)
FIGS. 2A-2B are schematics of a system according to the prior art comprising the use of two heated platens in a hydraulic press (FIG. 2A) and a photograph of the representative system (FIG. 2B).
Figure 2B:
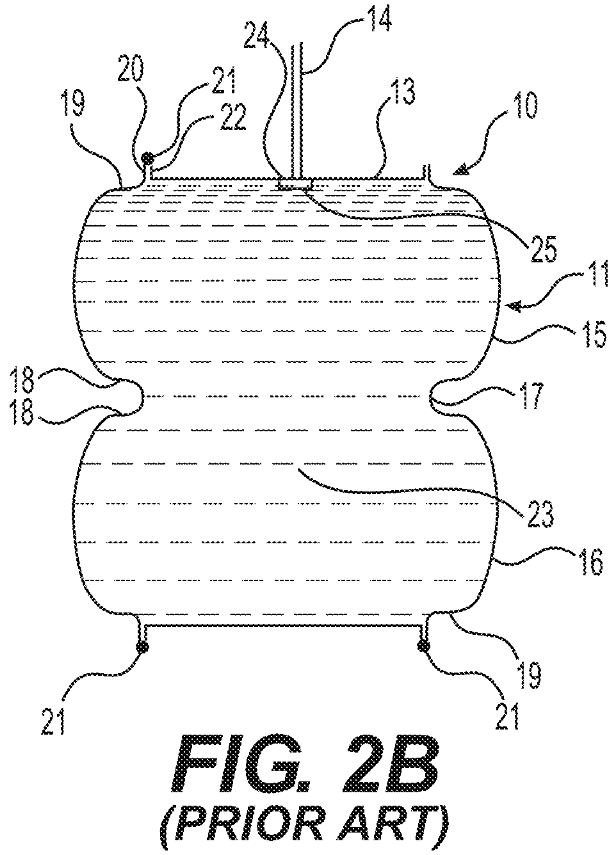
FIG. 2B (PRIOR ART)

As stated above, with radioactive ceramic and glass ceramic waste forms, this is not possible since it would require wall thickness of the container of 4" or more to prevent buckling. As a result, the approach for radioactive wastes has been to design HIP container that allows for large volume changes, two approaches have been taken. These have been referred to as the "bellows" design (see FIG. 2A) by Larker and the "dumb-bell" by Ramm (see FIG. 2B). A further description is provided in PCT publication WO 90/03648, which is incorporated by reference herein. There are inherent limitations to both these designs.

The bellows design for HIPing compacts is based on the expectation that the container collapse is predominately axial and therefore more predictable in terms of the final diameter. However, the detrimental and potential risks are related to pinhole failure of the HIP container. Pinhole failure of the container is where a defect in either the metal container or in a weld (more likely), allows high pressure gas to enter the container and then as the heating of the container and contents occur the pinhole either closes up entirely or reduces. At the end of the HIP cycle peak temperature and pressure hold points the pressure is reduced along with the temperature. The rate at which the gas vents from the pressure vessel will be higher than the rate it can escape from the container and if the hole is sealed it cannot escape at all. The resulting pressure differential causes the container to expand, this expansion can cause damage to the furnace and in extreme cases potential damage the pressure vessel.

Alternatively, the "dumb-bell" design reduces the amount of expansion on pinhole failure but does not eliminate it. In addition, the final size is highly variable depending on the starting packing density of the contents. The height to diameter ratios of the final shape can vary significantly depending on the material being processed. Furthermore, the "dumb-bell" shape undergoes significant distortion or buckling of the canister walls during consolidation. This variability makes it difficult to optimize the filling of the over-pack as these tend to be a fixed size for transportation and disposal. For example, if a HIP container is oversized it will not fit in the internal diameter of the disposal over-pack container, leading to the need for an alternative container for disposal which may be difficult or costly.

Alternatively, if the final HIPed container is considerably smaller it will not be efficiently packed in the over-pack container, which can increase the cost of disposal with more over-packs required. The other approach is to allow for the starting size of the HIP container to fit into the "over-pack" thus assuming worst case and no shrinkage occurs. This leads to the benefits of volume reduction by the HIP process for radioactive waste being negated for final disposal.

Unlike the prior art, the disclosed HIP container is designed to collapse to a predetermined size or within a dimensional window that allows for efficient packing of the disposal over-pack. One benefit of this design is that it allows the final shape of a HIPed radioactive waste-form block to be a right cylinder so that it can be inserted into a cylindrical "over-pack" disposal canister. For example, in the U.S. these canisters are typically two (2) feet diameter× ten (10) feet (or 15 feet) long. If the ideal final shape of a product is a right cylinder, and the metal powder was non-radioactive, one would start with a right cylinder and then be able to calculate shrinkage and the metal container wall thickness to prevent distortion.

Figure 3A:
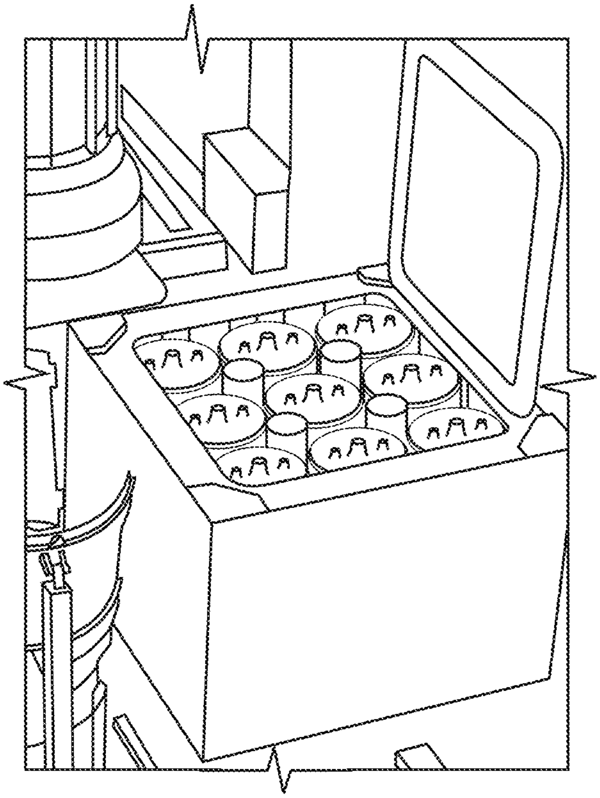
FIG. 3A is a schematic of a 3×3 meter box used for over-packing and disposal in UK.
Figure 3B:
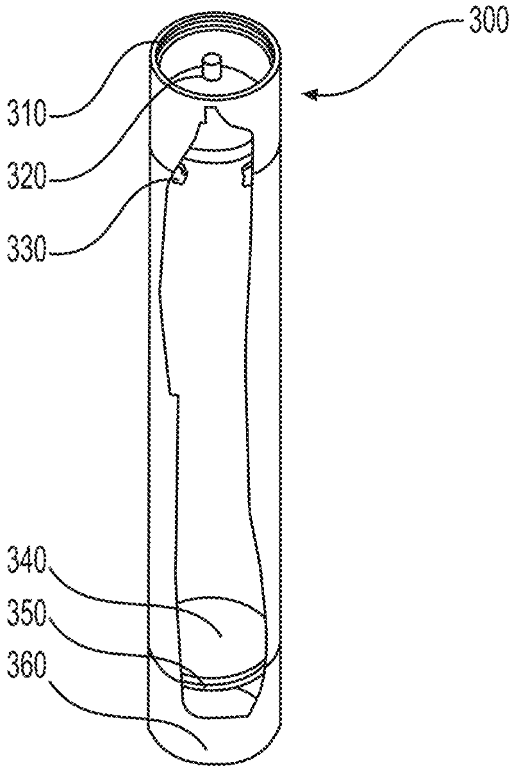
FIG. 3B is a schematic of an over pack container used in the USA.

FIGS. 3A and 3B are schematics of packing systems, with a non-limiting example of a box (FIG. 3A) for holding the HIP'ed canister shown in FIG. 3B. In particular, FIG. 3A shows a schematic of a 3×3 meter box used for over-packing and disposal in the United Kingdom. FIG. 3B is a schematic of an over-pack container used in United States (300) comprising a lifting ring (310), an optional plug (320), a backing ring (330), an impact plate (340), a shallow dished head (350), and a skirt (360). In one non-limiting embodiment, the U.S. container is depicted in FIG. 3B. This embodiment describes a container having a nominal outside diameter of either 18 or 24 inches. For an 18-inch container, the wall thickness is generally about ⅜ inches, and the wall thickness is about ½ inch for a container that is 24 inches in diameter. In an embodiment, the container depicted in FIG. 3B may have a maximum weight ranging from 5,000 to 10,000 pounds with fuel. This weight is generally associated with a canister having an external length of 110 to 120 inches, such as 118 inches (5,000 pounds) to external lengths of 175 to 185 inches, such as 180 inches (10,000 pounds). In one embodiment, the body of the canister shown in FIG. 3B is made of a metal, such as a stainless steel (SS316 L) nickel, titanium, mild steel, aluminum, or copper.

In an embodiment, there is described a container for the consolidation of material under elevated pressure and temperature conditions. As used herein, "under elevated pressure and temperature conditions" means above standard pressure and temperature conditions, such as by hot-isostatic pressing. For example, in one embodiment, such conditions include temperatures ranging from 800 to 1400° C., such as 1000 to 1250° C., pressures ranging from 10 to 300 MPa, such as 50 to 200 MPa, for a time ranging from 8 to 14 hours, such as 10 to 12 hours. A more detailed description of HIP conditions that can be used herein is provided in U.S. Pat. No. 8,754,282, which is herein incorporated by reference in its entirety.

In an embodiment, the container may comprise an outer cylinder and an inner cylinder comprising internal compression plates that are configured to resist collapse. In an embodiment, these compression plates are configured to resist collapsing during consolidation by arranging the plates in rows and with predetermined spacing, axially, radially, or both.

While the container described herein can be used to consolidate any type of material, in various embodiments the material comprises solid or liquid hazardous, toxic, or radioactive waste, and the container is configured to hold such waste without releasing it to the environment. In one embodiment, the material comprises a solid waste, such as a particulate material comprising hazardous, toxic, or radioactive materials.

In an embodiment, the material to be consolidated comprises liquid waste, including but not limited to spent fuel pond sludge, a radioactive sludges, or other toxic sludges or slurries. The described solid or liquid materials may comprise at least one element typically found in the foregoing wastes, such as magnesium, plutonium, aluminum, graphite, uranium, and other nuclear power plant decommissioning wastes, zeolitic materials, and contaminated soils.

In an embodiment, the inner and outer cylinders are made from a metal comprising steel, nickel, titanium, aluminum, copper, alloys thereof, or combinations thereof. In an embodiment, the inner cylinder has at least one different characteristic from the outer cylinder. For example, the different characteristic may comprise one or more of malleability, corrosion resistance, or wall thickness. In an embodiment the outer cylinder has a wall thickness that is thicker than the inner cylinder.

In an embodiment the inner cylinder comprises a layer that is chemically reactive with the material located in the container. For example, the layer may comprise titanium in an amount sufficient to (i) react with oxygen that degases from the waste material being consolidated, (ii) control the redox of the powdered waste material, or (iii) combinations thereof.

In an embodiment the internal compression plates comprise a material that has a higher strength than the inner cylinder, the outer cylinder, or both, such that it resists collapse and deformation under hot isostatic pressing conditions, wherein the material comprises a metal, ceramic, graphite or combinations thereof.

In an embodiment the internal compression plates are curved to match the radius of the inner and outer container and are positioned between the inner and outer cylinders.

In an embodiment the internal compression plates are configured to touch at least one other compression plate during hot isostatic pressing. For example, the internal compression plates may comprise right angled edges. In the same or another embodiment, the internal compression plates have angled or recessed edges to cause interlocking or guide the plates to slide over each other during hot isostatic pressing.

In an embodiment the container described herein may comprise a liner configured around the compression plates that help lock the plates into position.

There is also disclosed a method of producing a consolidated article using the container described herein. For example, in an embodiment, the method comprises filling a container with material to be consolidated, such as hazardous, toxic, or radioactive waste. As previously described, this method uses a container comprising: an outer cylinder; an inner cylinder comprising internal compression plates that are configured to resist collapse during consolidation. The method may further comprise collapsing the by applying heat and/or pressure to the container, such as by hot isostatic pressing.

During the consolidation step the internal compression plates cause the container to collapse in a predictable manner while consolidating the material in the container to produce a consolidated article having a predictable shape and/or dimension. As used herein, "having a predictable shape and/or dimension" means, inter alia, that the consolidated article has straight walls that allow the HIPed can to be more readily inserted into a disposal canister.

In an embodiment, the method further comprising evacuating and sealing the container prior to consolidating.

In an embodiment, the method further comprises configuring the plates to resist collapse during consolidation are lined up in rows and with predetermined spacing both axially and radially.

In an embodiment, the configuring comprises positioning the compression plates between the inner and outer cylinders.

In an embodiment, the method further comprises reacting the material to be consolidated with at least one material located on or within the inner cylinder. For example, the method of reacting comprises (i) reacting with oxygen that degases from the waste material being consolidated, (ii) controlling the redox of the powdered waste material, or (iii) combinations thereof.

The disclosed elements of this design are configured to include an outer and inner cylinder, with inner plates lined up in rows and with predetermined spacing both axially and radially, as shown in FIG. 4. With specific reference to FIGS. 4A through 4E, there are shown schematics of elements used in a Controlled Collapse HIP Container according to the present disclosure, comprising outer (FIG. 4A) and inner cylinders (FIG. 4C) and compression plates (FIG. 4B). The compression plates of FIG. 4B are lined in rows and with predetermined spacing both axially and radially. FIG. 4D is a depiction of the final assembled product, and FIG. 4E depicts a cross-section view of the final product.

In one embodiment, the inner and outer shells are made from metal such as stainless steel, nickel, titanium, mild steel, aluminum, copper or other. They may be the same composition or different to each other depending on potential intent or function. For example, the inner layer may serve to be more or less reactive with the composition of the contents, such as being made from titanium to react with any excess oxygen or to control the redox of the calcine/powdered contents. The outer may be made of a more malleable alloy to allow for greater deformation or of a metal to be more corrosion resistant such as stainless steel.

In one embodiment, the outer layer will generally be of thicker wall thickness than the inner liner as it is the primary structural member of the container and its function is to maintain its shape during handling and filling of the HIP container. The thick outer wall will also resist buckling or creasing as has been observed in the commercially available HIP containers. After the hot isostatic pressing the container will be still a right cylinder with minimal buckling and creasing. This will lead to a number of benefits, including: symmetrical shape for ease of handling and loading into over-pack for disposal; and minimal creasing/buckling, which will allow for ease of external cleaning and decontamination if required.

In an embodiment, consolidating a HIPed can that has straight walls, as described throughout this disclosure, allows the HIPed can to more easily be inserted into a disposal canister. There is also disclosed an embodiment in which the outer HIP canister can be engineered such that the outer can becomes the final disposal canister. In this embodiment, the outer can wall can be engineered such that outer walls remain straight and because the high integrity of the can, the can becomes the disposal canister. This embodiment would negate the need for it to be overpacked into a disposal canister, unlike a thin walled can such as a bellows or Dumbbell, described above, that will not have the durability or the structural integrity to be considered a disposal canister.

The internal compression plates will typically be made of a higher strength material that resists collapse and deformation under HIP compression conditions. The compression plates can be curved to match the radius of the inner and outer cylinder. In one embodiment, they can be made from a metal, light weight ceramic, graphite or combinations of these.

In one embodiment, the internal compression plates are sandwiched between the inner and outer shells. Their position can be arranged either by welding, adhering or using a mesh to align and locate their position. This maintains the spatial arrangement during fabrication. In one embodiment, the assembly is put together resulting in the layered construction shown in FIG. 6. Then the layer will have end caps attached to form an enclosed container. These end caps or lids can be welded on or attached via different means as described in variants.

The HIP container according to the present disclosure is designed so that when the compression plates touch during the shrinkage of the main body of the container during the HIP cycle, they will resist any further collapse and therefore control the size of the HIP container to a predictable shape and dimension. A representation of this is shown in FIG. 5.

Figure 4A:
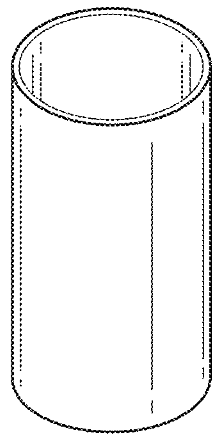
FIGS. 4A-4E are schematics of elements used in a Controlled Collapse HIP Container according to the present disclosure, including outer (FIG. 4A) and inner cylinders (FIG. 4C) and the compression plates (FIG. 4B). The final assembled product (FIG. 4D) is also shown in cross section (FIG. 4E).
Figure 4B:
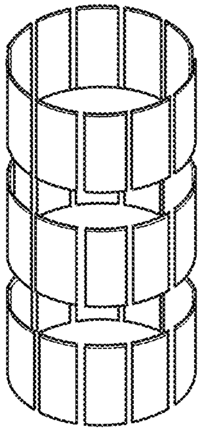
Figure 4C:
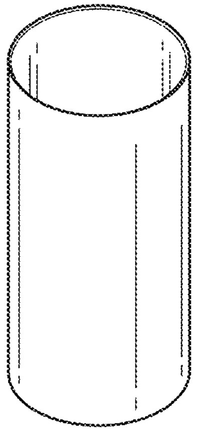
Figure 4D:
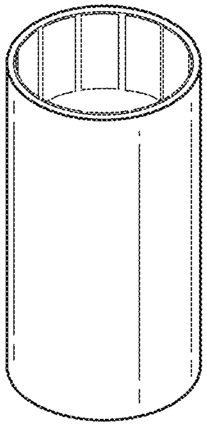
Figure 4E:
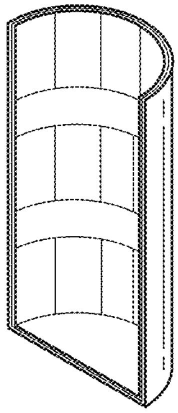
Figure 5A:
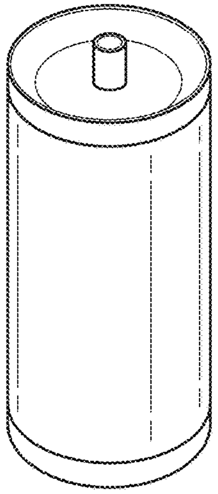
FIGS. 5A-5F are schematics of embodiments according to the present disclosure.
Figure 5B:
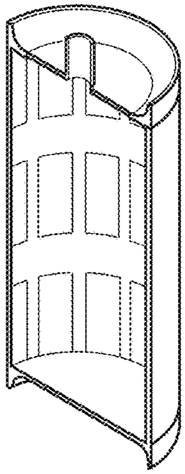
Figure 5C:
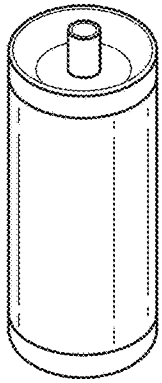
Figure 5D:
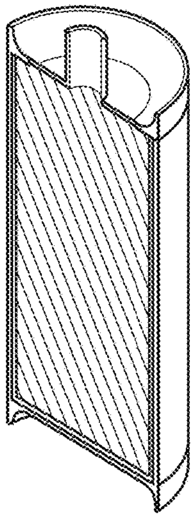
Figure 5E:
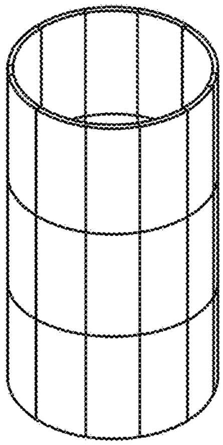
Figure 5F:
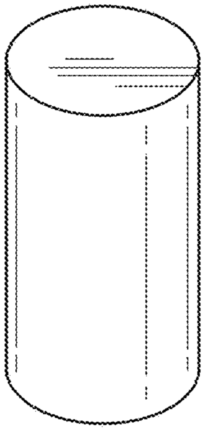
Figure 6A:
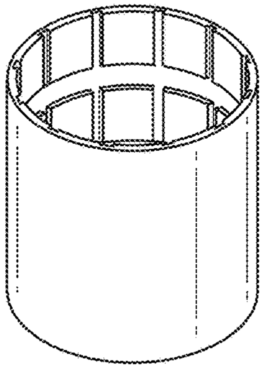
FIGS. 6A-6D show the hydrostatic forming of the liner to conform around the pressure plates including the outer cylinder containing the pressure plates (FIG. 6A), the liner (FIG. 6B), the final assembled product (FIG. 6C), which is also shown in cross section (FIG. 6D).
Figure 6B:
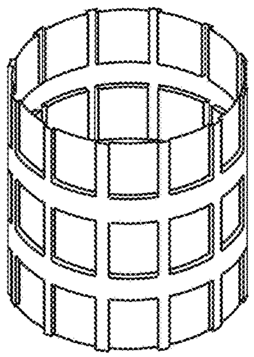
Figure 6C:
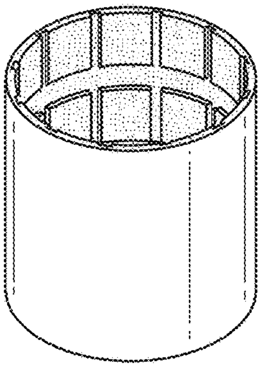
Figure 6D:
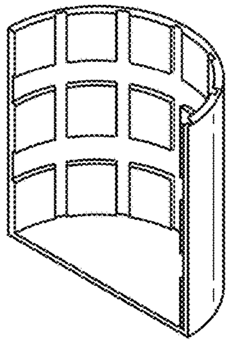

FIGS. 5A and 5B are schematics of the embodiment of FIGS. 4D and 4E, with end plates and lids. FIGS. 5C through 5E depict the final product of the present invention and reflect the shrinkage of the consolidated material after HIPing. FIG. 5E depicts how the compression plates of FIG. 4B will collapse after HIPing. In that process, the compression plates of FIG. 4B collapse to either touch as depicted in FIG. 5E or interlock, but they interact so as to prevent any further collapse of the overall canister. The finished consolidated material outside of the Controlled Collapse HIP Container of the present disclosure is shown in FIG. 5F.

In various embodiment, the compression plates may either have right angled edges so that when they touch they butt up to each other or they may be angled or recessed so as to cause interlocking or guidance to slide over each other in a prescribed way.

Variants: Hydroforming Variant

Taking the fabrication method described above, once assembled a hydrostatic pressure can be applied to the inner liner. In one embodiment, this hydrostatic pressure will cause the liner to form around the compression plates helping to lock the plates into position. As the liner is comparatively thin in relation to the outer liner, the pressure applied is such it will only cause the inner liner to form around the plates. The benefit of this design is to provide initiation points that allow the deformation of the inner liner, both in the axial and radial directions.

In an embodiment, the liner hydrostatically formed in situ to conform to the plates is shown in FIG. 6. In particular, FIGS. 6A through 6D show the hydrostatic forming of the liner to conform around the pressure plates including the outer cylinder containing the pressure plates (FIG. 6A), the liner (FIG. 6B), and the final assembled product (FIG. 6C), according to an embodiment of the present invention. FIG. 6D depicts a cross-section of this embodiment.

Alternatively, the hydrostatic pressure can be applied to both sides of the inner and outer shells causing them to mold around the plates. This may provide some benefit in some circumstances to initiate the shrinkage of the container during HIPing.

In one embodiment, the HIP container may comprise a "dumbbell-shape," but further comprising inner and outer shell plates that are placed at regular spacing's around the diameter. In one embodiment, the inner and outer shell plates that are placed around the diameter of the dumbbell container as a continuous ring.

Casting Variant

In another embodiment, the outer liner and compression plates are not made using the previously described hydroforming technique but via casting. The casting of outer liner and compression plates as one unit has several advantages over the methods described above. One such advantage is it removes the need to locate the compression plates in array before inserting an inner liner. A disadvantage is that the plates and the outer are limited to the same material.

Figure 7A:
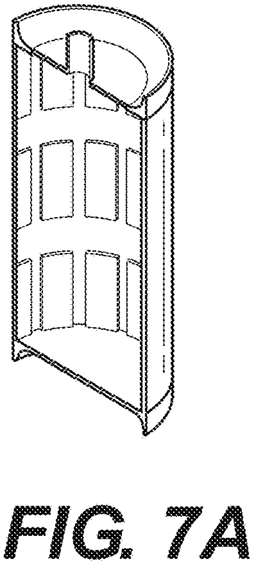
FIGS. 7A and 7B show the cast body of the container including cast in compression plates.
Figure 7B:
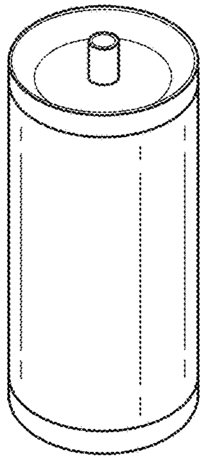
Figure 7C:
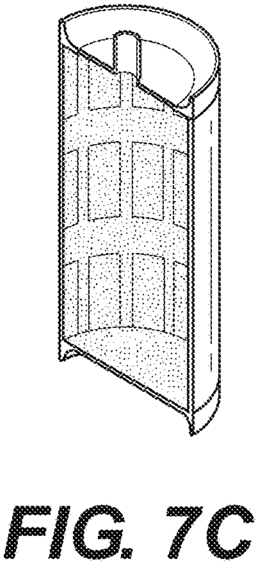

Also, it may be possible to cast in either the base or the top lid, or both. The casting in both lids would preclude the use of the inner liner but this may not be needed for all waste types. FIG. 7 shows the concept of cast body and plates. In particular, FIGS. 7A and 7B show the cast body of the container including cast in compression plates. FIG. 7C shows the inner liner inserted prior to top lid being welded in.

Figure 8A:
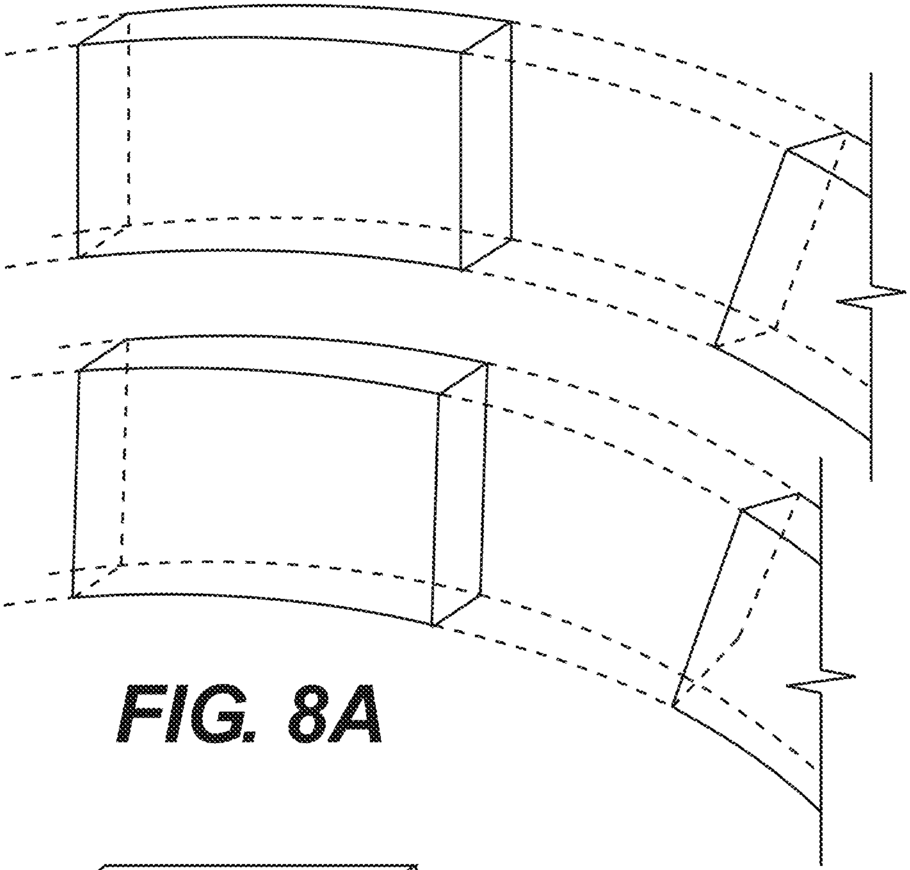
FIGS. 8A and 8B show various embodiments of internal compression plates described herein.
Figure 8B:
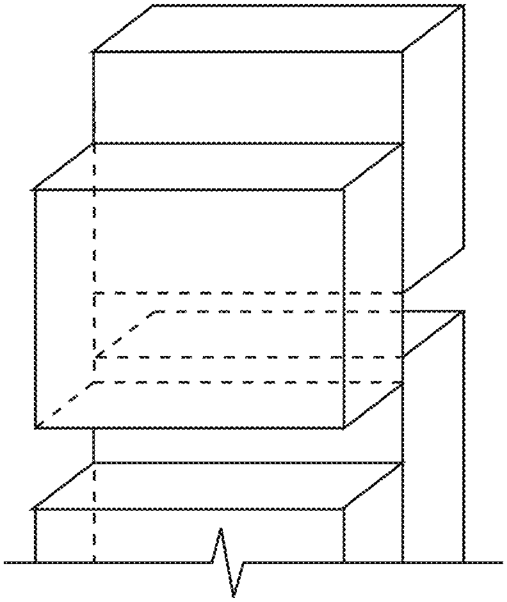

Regardless of how they are made, in various embodiments, the internal compression plates described herein can be configured to match the shape of the container. For example, FIG. 8A is a schematic of an internal compression plate that is curved to match the radius of the inner and outer containers. FIG. 8B is a schematic of an internal compression plate that is configured to touch at least one other compression plate during hot isostatic pressing that specifically comprises right angled edges.

Variant of Pressure Relief:

As previously noted, one limitation of the commercially available HIP containers described in the prior art is related to entrapped gas. The trapping of gas inside a HIP-container could lead to uncontrolled expansion, and as shown in the example of the bellows HIP container, have catastrophic failure. To avoid such a problem, there is disclosed a pressure relief system that can be incorporated into the body of the HIP container. It is desired that the pressure relief system will allow gas to escape, but will not lead to release of the radioactive contents.

In one embodiment, the pressure relief system described herein would take the form of a sintered metal or ceramic filter covered by thin metallic or ceramic membrane. The porous sintered filter will face the inside of the HIP container and the membrane will be on the outside face of the container. In filling and evacuating the HIP container the membrane provides a seal supported by the underlying porous filter. During HIPing process if gas is present, the membrane will prevent the porous metal or ceramic filter from collapsing. In addition, if the pressure rises above the design pressure of the membrane, the membrane will rupture thereby releasing the excessive gas. In one embodiment, the rupture pressure will be designed so as to prevent any deformation of the HIP container. In addition, the filter will prevent the escape of any radioactive particulate material into the HIP.

If no gas is present inside the HIP container described herein, the sintered metal or ceramic filter can be chosen so that it will densify to form a solid plug. In another embodiment, rather than selecting a material that will densify at the HIP conditions used, the material may be specifically selected not to densify at the HIPing pressure and temperature.

It will be apparent to those skilled in the art that various modifications and variations can be made to the disclosed alloy and method of forming the alloy into a finished part without departing from the scope of the disclosure. Alternative implementations will be apparent to those skilled in the art from consideration of the specification and practice disclosed herein. It is intended that the specification and examples be considered as exemplary only, with a true scope of the disclosure being indicated by the following claims and their equivalents.

What is claimed is:

1. A container for the consolidation of material under elevated pressure and temperature conditions, comprising:

an outer cylinder; and an inner cylinder comprising internal compression plates that are positioned between the inner and outer cylinders and curved to match the radius of the inner and outer cylinders, wherein said compression plates are arranged in rows and with predetermined spacing, axially, radially, or both.

2. The container of claim 1, wherein the material comprises hazardous, toxic, or radioactive waste, and the container is configured to hold such waste without releasing it to the environment.

3. The container of claim 1, wherein the inner and outer cylinders are made from metal comprising steel, nickel, titanium, aluminum, copper, alloys thereof, or combinations thereof, wherein the inner cylinder has at least one different characteristic from the outer cylinder, said characteristic comprising malleability, corrosion resistance, or wall thickness.

4. The container of claim 1, wherein the inner cylinder comprises a layer that is chemically reactive with the material located in the container.

5. The container of claim 4, wherein said layer comprises titanium in an amount sufficient to (i) react with oxygen that degases from the waste material being consolidated, (ii) control the redox of the powdered waste material, or (iii) combinations thereof.

6. The container of claim 1, wherein the outer cylinder has a wall thickness that is thicker than the inner cylinder.

7. The container of claim 1, wherein the internal compression plates comprise a material that has a higher strength than the inner cylinder, the outer cylinder, or both, such that it resists collapse and deformation under hot isostatic pressing conditions, wherein said material comprises a metal, ceramic, graphite or combinations thereof.

8. The container of claim 7, wherein the internal compression plates are configured to touch at least one other compression plate during hot isostatic pressing.

9. The container of claim 8, wherein the internal compression plates comprise right angled edges.

10. The container of claim 7, wherein the internal compression plates have angled or recessed edges to cause interlocking or guide the plates to slide over each other during hot isostatic pressing.

11. The container of claim 1, further comprising a liner configured around the compression plates that help lock the plates into position.

12. The container of claim 1, wherein the outer cylinder comprises walls of sufficient thickness to allow the walls to remain straight after being exposed to said elevated pressure and temperature conditions.

13. A method of producing a consolidated article, the method comprising:

filling a container with material to be consolidated, the container comprising:

an outer cylinder;

an inner cylinder comprising internal compression plates that are positioned between the inner and outer cylinders and curved to match the radius of the inner and outer cylinders, wherein said compression plates are; and collapsing the by applying heat and/or pressure to the container such that the internal compression plates cause the container to collapse in a predictable manner while consolidating the material in the container to produce a consolidated article having a predictable shape and/or dimension.

14. The method of claim 13, further comprising evacuating and sealing the container prior to consolidating.

15. The method of claim 13, wherein the material comprises hazardous, toxic, or radioactive waste, and the container is configured to hold such waste without releasing it to the environment.

16. The method of claim 13, further comprising configuring the plates to resist collapse during consolidation are lined up in rows and with predetermined spacing both axially and radially.

17. The method of claim 13, further comprising reacting the material to be consolidated with at least one material located on or within the inner cylinder.

18. The method of claim 17, wherein the material located on or within the inner cylinder comprises titanium, and said reacting comprises (i) reacting with oxygen that degases from the waste material being consolidated, (ii) controlling the redox of the powdered waste material, or (iii) combinations thereof.

19. The method of claim 13, wherein collapsing the by applying heat and/or pressure to the container comprises hot isostatic pressing at a temperature ranging from 800 to 1400° C. and pressure ranging from 10-300 MPa for a time ranging from 8 to 14 hours.

* * * * *